(12) United States Patent
Jung et al.

(10) Patent No.: US 9,207,448 B2
(45) Date of Patent: Dec. 8, 2015

(54) APPARATUS FOR ADJUSTING APERTURE USING MICROELECTROFLUIDIC METHOD

(71) Applicant: SAMSUNG ELECTRONICS CO., LTD., Suwon-si (KR)

(72) Inventors: Kyu-dong Jung, Suwon-si (KR);
Jong-hyeon Chang, Suwon-si (KR);
Seung-wan Lee, Suwon-si (KR);
Eun-sung Lee, Hwaseon-si (KR);
Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 14/149,235

(22) Filed: Jan. 7, 2014

(65) Prior Publication Data

US 2014/0192218 A1    Jul. 10, 2014

(30) Foreign Application Priority Data

Jan. 7, 2013 (KR) .................. 10-2013-0001783

(51) Int. Cl.
*G02B 26/02* (2006.01)
*G02B 26/00* (2006.01)
*G02B 5/00* (2006.01)

(52) U.S. Cl.
CPC .............. *G02B 26/005* (2013.01); *G02B 5/005* (2013.01)

(58) Field of Classification Search
CPC ........ G02B 26/005; G02B 5/005; G03B 9/02; G03B 9/08
USPC ........................................................ 359/228
See application file for complete search history.

(56) References Cited

U.S. PATENT DOCUMENTS

| | | | |
|---|---|---|---|
| 2011/0117637 A1 | 5/2011 | Gray et al. | |
| 2013/0306480 A1* | 11/2013 | Chang et al. | .................. 204/547 |

FOREIGN PATENT DOCUMENTS

| | | | |
|---|---|---|---|
| JP | 2006285031 A | 10/2006 |
| JP | 4863044 B2 | 1/2012 |
| KR | 1020050109943 A | 11/2005 |
| KR | 1020070039165 A | 4/2007 |
| KR | 1020080029870 A | 4/2008 |
| KR | 1020100116580 A | 11/2010 |
| KR | 1020120014408 A | 2/2012 |
| KR | 1020130009504 A | 1/2013 |

* cited by examiner

*Primary Examiner* — James Phan
(74) *Attorney, Agent, or Firm* — Sughrue Mion, PLLC

(57) ABSTRACT

Provided is an aperture adjusting apparatus for adjusting an aperture through which light transmits. The aperture adjusting apparatus includes: a chamber configured to have space in which fluid flows, the chamber including a lower channel, an upper channel, and a plurality of reservoir regions connecting the lower channel and the upper channel and each having a non-uniform width crossing a flow direction of a fluid to form a space in which fluid flows; a photo-interceptive first fluid and a photo-transmissive second fluid having a property that the photo-transmissive second fluid does not mix with the first fluid and that are prepared in the chamber; and a first electrode unit in which one or more electrodes to which a voltage is applied are arrayed to form an electric field in the chamber, wherein an aperture through which light transmits is adjusted by a location change of an interface between the first fluid and the second fluid according to the electric field.

25 Claims, 8 Drawing Sheets

APPARATUS FOR ADJUSTING APERTURE USING MICROELECTROFLUIDIC METHOD

CROSS-REFERENCE TO RELATED APPLICATIONS

This application claims priority Korean Patent Application No. 10-2013-0001783, filed on Jan. 7, 2013, in the Korean Intellectual Property Office, the disclosure of which is incorporated herein in its entirety by reference.

BACKGROUND

1. Field

Apparatuses and methods consistent with exemplary embodiments relate to an aperture adjusting apparatus for adjusting an aperture through which light transmits in a microelectrofluidic method.

2. Description of the Related Art

A technique of adjusting and controlling a transmissivity of light is widely used for an iris or a shutter in image acquisition devices or used to drive individual pixels in image display devices.

A variable iris generally used in existing optical systems mainly uses a method of manipulating several metal blades, wherein a mechanical motion, a frictional force, and the use of a moving mechanical element causes miniaturization to be limited.

Although a microelectromechanical system (MEMS) iris of an electrothermal or electrostatic scheme has been introduced, an aperture is non-circular, there is a gap between blades, and a maximum aperture ratio is problematically low as 1% or less of the whole device area.

Along with the development of optofluidic technology in which micro-optics and microfluidics are combined, a variable iris of which an aperture ratio is adjusted by modifying a polydimethylsiloxane (PDMS) membrane using air pressure has been proposed. In this case, a resolution of a variable iris is improved using a three-dimensional structure and a capillary force. Compared with an existing MEMS iris, this iris has a higher aperture ratio but has a limitation that a syringe pump is used for driving thereof.

In addition, an iris using a liquid lens for which a dielectric force is used as a driving principle has been recently proposed, and in this case, an aperture ratio is adjustable only with an electrical wiring on the bottom of the iris and not with an external driving pump.

SUMMARY

One or more exemplary embodiments provide an aperture adjusting apparatus for adjusting an aperture through which light transmits using a microelectrofluidic method.

According to an aspect of an exemplary embodiment there is provided an aperture adjusting apparatus including: a chamber including a lower channel, an upper channel, and a plurality of reservoir regions connecting the lower channel and the upper channel, each of the plurality of reservoir regions having a non-uniform width; a first fluid that is photo-interceptive and contained in the chamber; a second fluid that is photo-transmissive and contained in the chamber, the second fluid having a property that the second fluid does not mix with the first fluid; and a first electrode unit comprising at least one electrode configured to, in response an applied voltage, form an electric field in the chamber to adjust an aperture through which light transmits by a location change of an interface between the first fluid and the second fluid according to the electric field.

One of the first fluid and the second fluid may be a polar fluid, and the other one may be a non-polar fluid.

The chamber may include: a first substrate on which the first electrode unit is disposed; a second substrate disposed apart from the first substrate, and in which a plurality of through holes respectively corresponding to the plurality of reservoir regions are provided; a third substrate separately disposed apart from the second substrate; a first spacer surrounding a space between the first substrate and the second substrate; and a second spacer surrounding a space between the second substrate and the third substrate.

Each reservoir region may have a shape so that a curvature of a surface of the first fluid in the reservoir region is less than a curvature of a surface of the first fluid in the lower channel.

A side surface of each of the plurality of through holes may be sloped by a predetermined angle with respect to a surface of the second substrate.

An angle of the side surface of each of the plurality of through holes may be determined as a magnitude corresponding to a contact angle formed by the first fluid on an interface hydrophobic to the first fluid.

The plurality of through holes may have a truncated cone shape.

The plurality of through holes may have an hourglass shape of which a central part has a narrow width.

The plurality of through holes may be formed along an outer circumferential area of the second substrate.

A through hole may be further formed at a central area of the second substrate.

The first fluid may be disposed in a circumferential area of the lower channel and the plurality of reservoir regions.

A flow of the first fluid may be limited to the plurality of reservoir regions and a region of the lower channel and may not move to the upper channel.

The at least one electrode of the first electrode unit may include at least one circular annulus electrode coated with an insulation layer, and the insulation layer may be hydrophobic-surface-treated against the first fluid.

The aperture adjusting apparatus may further include a second electrode unit including at least one electrode disposed on a lower surface of the second substrate.

The at least one electrode of the second electrode unit may include at least one circular annulus electrode coated with an insulation layer, and the insulation layer may be hydrophobic-surface-treated against the first fluid.

The aperture adjusting apparatus may further include a ground electrode provided in the chamber at a location contacting a polar fluid from among the first fluid and the second fluid, and the ground electrode may be disposed on the first substrate.

The aperture adjusting apparatus may further include an opaque pattern part which is configured to block light transmitted through the lower channel and the upper channel, and is disposed on at a central area of the third substrate.

The opaque pattern part may have a size corresponding to a minimum size of the aperture, which is determined according to the flow of the first fluid and the second fluid.

According to an aspect of another exemplary embodiment, there is provided an image acquisition device including: the aperture adjusting apparatus described above; an imaging part configured to form an image of an object from light incident through the aperture adjusting apparatus; and an image pickup device configured to convert the image formed by the imaging part into an electrical signal.

According to an aspect of another exemplary embodiment, there is provided an image display device including: a light source unit configured to provide light for forming an image; and a display panel formed by arraying a plurality of aperture adjusting apparatuses described above to adjust a transmissivity of the light provided by the light source unit according to image information.

The display panel may include: one aperture adjusting apparatus described above, in which the second fluid is configured to represent a first color; one aperture adjusting apparatus described above, in which the second fluid is configured to represent a second color; and one aperture adjusting apparatus described above, in which the second fluid is configured to represent a third color.

The image acquisition device may further include a color filter having color regions respectively corresponding to the plurality of aperture adjusting apparatuses and disposed on the display panel.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
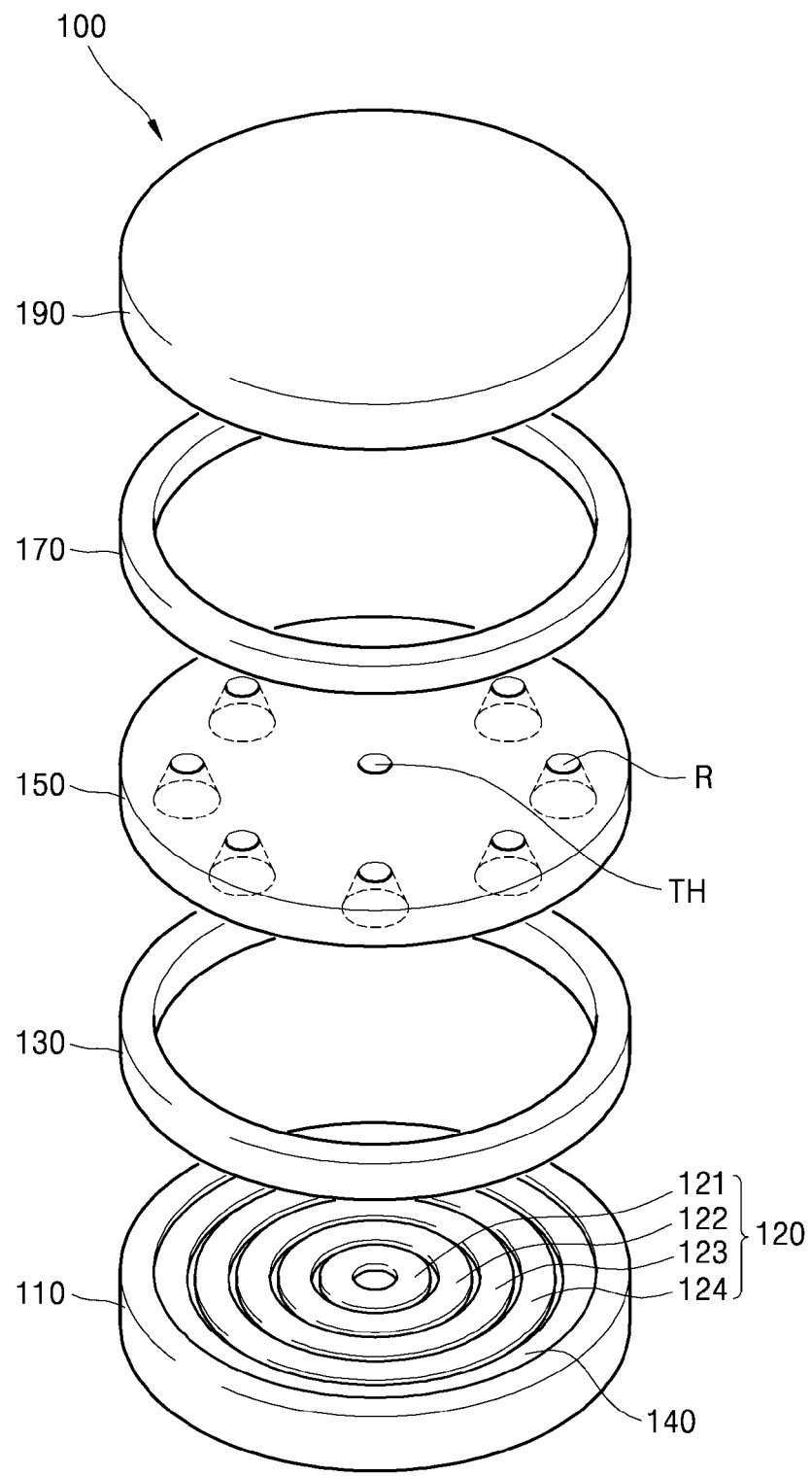
FIG. 1 is an exploded perspective view showing a schematic structure of an aperture adjusting apparatus according to an exemplary embodiment.

Reference will now be made in detail to embodiments, examples of which are illustrated in the accompanying drawings, wherein like reference numerals refer to like elements throughout, and a size of each component in the drawings may be exaggerated for clarity and convenience of description. In this regard, the exemplary embodiments may have different forms and should not be construed as being limited to the descriptions set forth herein. Accordingly, the embodiments are merely described below, by referring to the figures, to explain aspects of the present description.

Figure 2A:
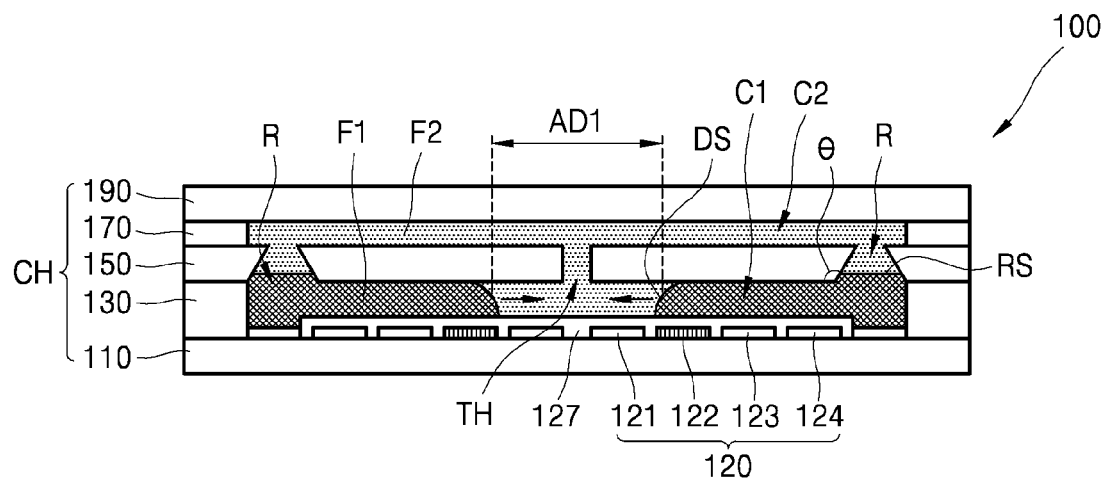
FIGS. 2A and 2B are cross-sectional views showing a schematic structure of the aperture adjusting apparatus of FIG. 1, wherein apertures with different sizes are formed.
Figure 2B:
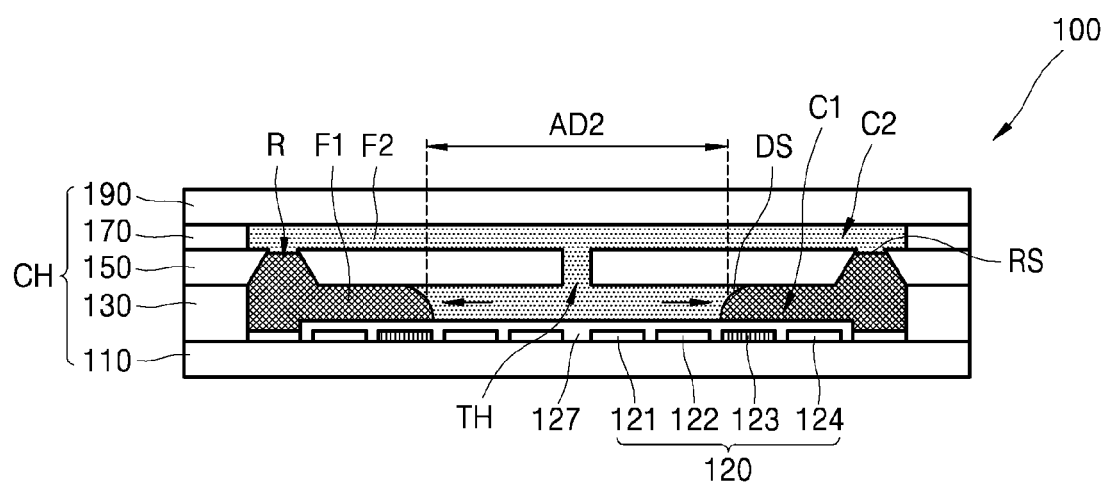

FIG. 1 is an exploded perspective view showing a schematic structure of an aperture adjusting apparatus 100 according to an exemplary embodiment, and FIGS. 2A and 2B are cross-sectional views showing a schematic structure of the aperture adjusting apparatus 100 of FIG. 1, wherein apertures with different sizes are formed. However, some components are omitted in the perspective view of FIG. 1 for convenience of description.

Referring to FIGS. 1, 2A and 2B, the aperture adjusting apparatus 100 includes a chamber CH having a lower channel C1, an upper channel C2, and a reservoir region R connecting the lower channel C1 and the upper channel C2, the chamber forming a space in which a fluid flows; a photo-interceptive first fluid F1 and a photo-transmissive second fluid F2 having a property that the photo-transmissive second fluid F2 does not mix with the first fluid F1 and that are provided in the chamber CH; and a first electrode unit 120 in which one or more electrodes to which a voltage is applied are arrayed to form an electric field in the chamber CH. According to the electric field, a location of an interface between the first fluid F1 and the second fluid F2 changes, thereby adjusting an aperture through which light transmits. In addition, the aperture adjusting apparatus 100 of the current embodiment includes the reservoir region R having a shape so that a fluid smoothly flows in an aperture opening/closing operation. The reservoir region R may be formed with a non-uniform width across a fluid flow direction in the reservoir region R.

A more detailed configuration and operation will now be described.

The chamber CH includes a first substrate 110 on which the first electrode unit 120 is disposed, a second substrate 150, which is separately disposed on the first substrate 110 and in which a plurality of through holes respectively corresponding to a plurality of reservoir regions R are formed, a third substrate 190 separately disposed on the second substrate 150, a first spacer 130 surrounding a space between the first substrate 110 and the second substrate 150, and a second spacer 170 surrounding a space between the second substrate 150 and the third substrate 190. In addition, a through hole TH may be further provided at a central part of the second substrate 150.

The lower channel C1 is formed by the first substrate 110, the second substrate 150, and the first spacer 130, the upper channel C2 is formed by the second substrate 150, the third substrate 190, and the second spacer 170, and each reservoir region R is defined by a through hole formed near an outer circumference of the second substrate 150.

The first fluid F1 is disposed in a circumferential part of the lower channel C1 and the plurality of reservoir regions R. The second fluid F2 is disposed in the upper channel C2 and the central part of the lower channel C1.

The inside surface of the chamber CH may be hydrophobic-surface-treated. For example, the inside surface of the lower channel C1 that is a flow space of the first fluid F1 may be hydrophobic-surface-treated. To this end, the first substrate 110, the second substrate 150, and the first spacer 130 may be hydrophobic-surface-treated. Alternatively, the surface of an insulation layer 127 coating the first electrode unit 120 may be hydrophobic-surface-treated.

The reservoir regions R may have a truncated conical shape such that a side surface of a through hole forming a reservoir region R may sloped by a predetermined angle with respect to a surface of the second substrate 150. For example, an angle θ of the side surface of the through hole may be determined as a magnitude corresponding to a contact angle formed by the first fluid F1 on a membrane surface that is hydrophobic to the first fluid F1. For example, since a droplet located on a hydrophobic membrane has an attraction between liquid molecules that is greater than an attraction between liquid-solid molecules, a force to minimize a liquid-solid contact area (i.e., interfacial tension) works, and the droplet has a contact angle of 90° or more due to each interfacial tension between three phases of solid, liquid and gas. This contact angle is determined according to a fluid type and a hydrophobic membrane characteristic, and in the current embodiment, a side surface slope angle of the reservoir region R is determined by considering the hydrophobic property of the first fluid F1 to be used in the aperture adjusting apparatus 100 and the inside surface of the chamber CH. According to the shape of the reservoir region R, a curvature of an interface RS of the first fluid F1 in the reservoir region R is small. For example, the curvature of the interface RS may be less than a curvature of an interface DS of the first fluid F1, which is formed in the lower channel C1.

The reservoir region R is formed in a shape for the curvature of the interface RS formed in the reservoir region R to be small. In other words, while a pressure on a fluid interface is generally proportional to a curvature, the reservoir region R is formed in a shape so that the pressure formed on the interface RS formed in the reservoir region R is small. In the aperture adjusting apparatus 100, a flow speed of the first fluid F1 is determined by a difference between a pressure on the interface DS formed in the lower channel C1 and a pressure on the interface RS formed in the reservoir region R, and when the pressure on the interface RS formed in the reservoir region R is almost 0, a speed difference between a forward motion and a backward motion of the first fluid F1 is reduced, where "forward motion" indicates an operation in which the aperture becomes narrower when the first fluid F1 moves toward the central part of the lower channel C1 as shown in FIG. 2A, and "backward motion" indicates an operation in which the aperture becomes wider when the first fluid F1 moves toward the circumferential part of the lower channel C1 as shown in FIG. 2B. In detail, a flow speed of the first fluid F1 varies according to a location of the interface DS of the first fluid F1 and a forward or backward motion of the first fluid F1 in the lower channel C1, and a driving performance of the aperture adjusting apparatus 100 is determined by a minimum fluid flow speed. That is, a design for increasing the minimum fluid flow speed is necessary.

If it is assumed that a pressure on the interface RS formed in the reservoir region R is Pr that is a predetermined value greater than 0 (zero) and a pressure on the interface DS of the first fluid F1 in the lower channel C1 is Pd, a speed in the forward motion is proportional to Pd+Pr and a speed in the backward motion is proportional to Pd−Pr. That is, the greater the pressure Pr on the interface RS formed in the reservoir region R, the greater a difference between speeds in the forward motion and the backward motion, and the lesser the minimum speed. In the current embodiment, the shape of the reservoir region R is formed by setting a value of the pressure Pr to be almost 0, thereby reducing the difference between the speeds in the forward motion and the backward motion and increasing the minimum speed to improve a general driving speed.

The through hole forming the reservoir region R may have a truncated cone shape as shown in FIGS. 1 to 2B. However, the through hole forming the reservoir region R is not limited thereto. In addition, the number of reservoir regions R along the circumference of the second substrate 150 is not limited to the number shown in FIGS. 1 to 2B.

The first substrate 110, the second substrate 150, and the third substrate 190 may be formed of a photo-transmissive material, e.g., a glass or transparent plastic material.

One of the first fluid F1 and the second fluid F2 may be polar, and the other one may be non-polar.

The first fluid F1 is a fluid having a property of blocking or absorbing light and may be provided in the circumferential part of the lower channel C1 and the reservoir region R. A liquid metal or a polar liquid may be used for the first fluid F1. For example, a liquid metal, such as mercury (Hg), or a solution in which a dye is melted to be adequate for predetermined photoabsorption wavelength range may be employed for the first fluid F1. Examples of the dye are a carbon black absorbing a visible ray range, EpolightTM2717 that is a near-infrared ray absorption dye of which a maximum photoabsorption wavelength is about 968 nm by Epoline Corp, and NIR1054B that is a near-infrared ray absorption dye of which a maximum photoabsorption wavelength is about 1054 nm by QCR Solutions Corp.

The second fluid F2 is a photo-transmissive fluid that does not mix with the first fluid F1 and may be a gas or a non-polar liquid.

The first fluid F1 forms the interfaces DS and RS in the lower channel C1 and the reservoir region R, respectively, and a size of the aperture is adjusted by movement of the interfaces DS and RS according to a voltage applied to the first electrode unit 120.

The first electrode unit 120 may be formed on the first substrate 110 and includes one or more electrodes. The first electrode unit 120 is coated with the insulation layer 127, and the surface of the insulation layer 127 may be hydrophobic-surface-treated against the first fluid F1.

The first electrode unit 120 may be formed to include one or more electrodes for a digital control of the aperture. For example, as shown in FIGS. 1 to 2B, the first electrode unit 120 may include a plurality of electrodes 121, 122, 123, and 124 having concentric annulus shapes with different radiuses. However, a shape or the number of electrodes forming the first electrode unit 120 is not limited to the shown shape or number and may be variously modified.

A ground electrode 140 may be provided to maintain a contact with a polar fluid, e.g., the polar first fluid F1, at one or more places inside the chamber CH and may be disposed on the first substrate 110 as shown in FIG. 1.

The electrodes 121, 122, 123, and 124 included in the first electrode unit 120 may be formed of a transparent conductive material, for example, a metal oxide, such as indium tin oxide (ITO), indium zinc oxide (IZO), or the like, a metal nanoparticle dispersed thin film, such as gold (Au), silver (Ag), or the like, a carbon nanostructure, such as carbon nanotube (CNT), graphene, or the like, a conductive high molecule, such as poly(3,4-ethylenedioxythiophene) (PEDOT), polypyrrole (PPy), poly(3-hexylthiophene) (P3HT), or the like, or the like.

Since the transparency of the ground electrode 140 may not be necessary according to an arrangement location thereof, the ground electrode 140 may be formed of not only a transparent conductive material but also a metal thin film, such as gold (Au), silver (Ag), aluminum (Al), chromium (Cr), titanium (Ti), or the like.

In the aperture adjusting apparatus 100, a size of the aperture varies by adjusting an interface between the first fluid F1 and the second fluid F2 to move in a center direction or a reverse direction of the center direction by electrowetting driving and a pressure difference ΔP between the interface DS of the first fluid F1 contacting the first electrode unit 120 in the lower channel C1 and the interface RS of the first fluid F1 in the reservoir region R.

An electrowetting phenomenon is a phenomenon in which a contact angle of an electrolyte droplet varies when a voltage is applied to the electrolyte droplet on an electrode coated with an insulator. That is, a contact angle varies according to corresponding interfacial tension on a three-phase contact line (TCL) at which a fluid, a droplet, and an insulator meet. When the electrowetting phenomenon is used, a flow of a fluid may be quickly and effectively controlled using a low voltage, and the fluid may be reversibly transferred and controlled.

When a proper voltage is applied to any one electrode of the first electrode unit 120, an electromechanical force works at a TCL on an activated driving electrode (e.g., the electrode 122 as shown in FIG. 2A), that is, a contact line at which the first fluid F1, the second fluid F2, and the insulation layer 127 meet. Thus, the first fluid F1 moves to a central part through the lower channel C1, thereby decreasing the aperture to form an aperture diameter AD1.

In addition, as shown in FIG. 2B, when a voltage is applied to the electrode 123, the first fluid F1 moves to the reservoir region R through the lower channel C1, thereby increasing the aperture to form an aperture diameter AD2.

When the first electrode unit 120 includes the plurality of electrodes 121, 122, 123, and 124 each having a concentric annulus shape as shown in FIGS. 1 to 2B, a size of the aperture may be controlled in a digital method by changing an electrode to be activated. A gap between the plurality of electrodes 121, 122, 123, and 124 and the number of electrodes are not limited. For example, a gap between aperture sizes and the number of aperture sizes may be variously determined by adjusting the gap between the plurality of electrodes 121, 122, 123, and 124 and the number of electrodes.

The aperture adjusting apparatus 100 described above employs the reservoir region R having a shape minimizing a curvature of the interface RS of the first fluid F1 in the reservoir region R for a flow of the first fluid F1, and accordingly, an aperture opening/closing driving speed is improved. In addition, sizes of the plurality of reservoir regions R, the number of reservoir regions R, a height of the lower channel C1, and an amount of the first fluid F1 may be determined so that the flow of the first fluid F1 is limited to be within the reservoir region R and a region of the lower channel C1, and in this case, only the photo-transmissive second fluid F2 is disposed in the upper channel C2 and the photo-interceptive first fluid F1 does not move to the upper channel C2 to thereby improve an aperture ratio.

Although it has been described that the first fluid F1 blocking or absorbing light is polar and the photo-transmissive second fluid F2 is non-polar, the first fluid F1 blocking or absorbing light may be non-polar, and the photo-transmissive second fluid F2 may be polar.

Figure 3:
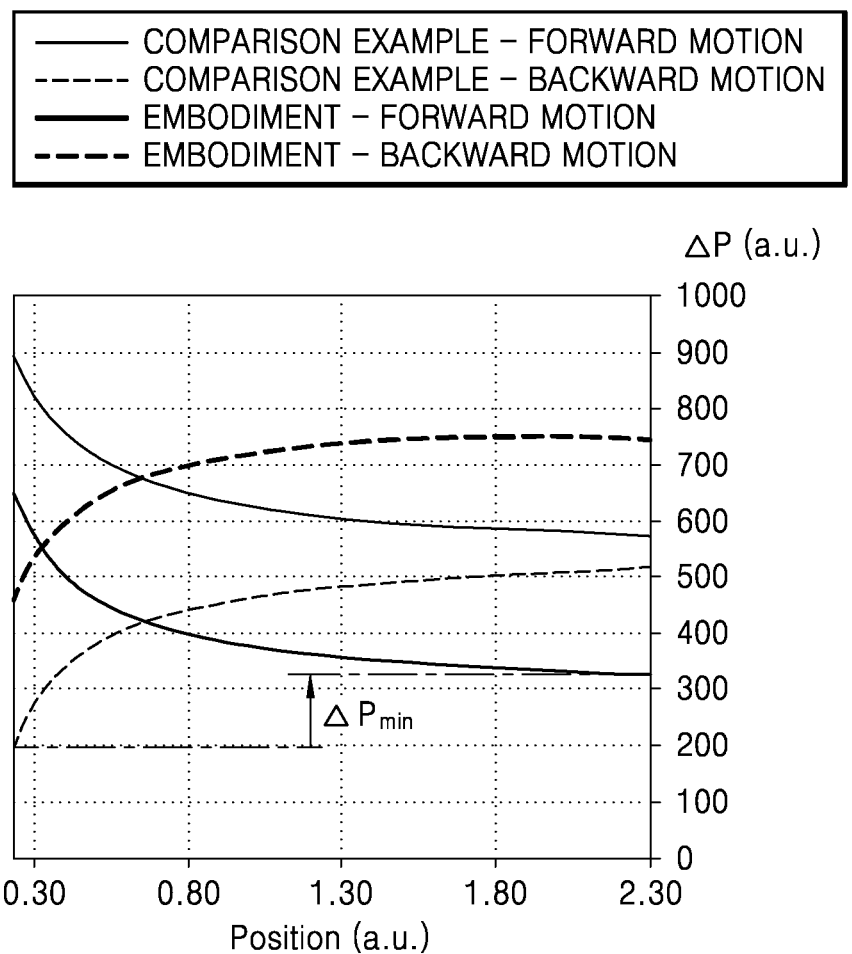
FIG. 3 is a graph comparing an aperture opening/closing speed of the aperture adjusting apparatus of FIG. 1 with a comparison example.

FIG. 3 is a graph comparing an aperture opening/closing speed of the aperture adjusting apparatus 100 of FIG. 1 with a comparison example.

Unlike the embodiment, the comparison example is a case where a reservoir region has a uniform width.

In the graph, a horizontal axis indicates a position of the interface DS of the first fluid F1 in the lower channel C1, and a vertical axis indicates a difference ΔP between a pressure on the interface DS of the first fluid F1 in the lower channel C1 and a pressure on the interface RS of the first fluid F1 in the reservoir region R. A flow speed of the first fluid F1 is proportional to ΔP.

Referring to the graph, compared with the comparison example, a pressure difference minimum value $\Delta P_{min}$ is improved in the embodiment.

Figure 4:
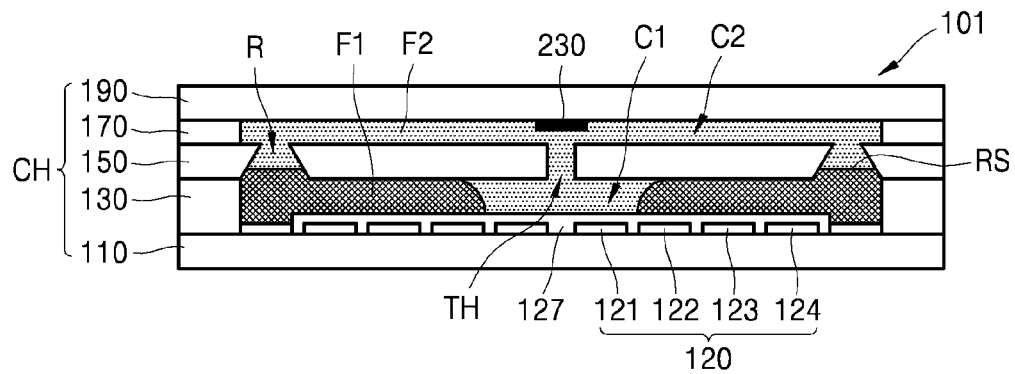
FIG. 4 is a cross-sectional view showing a schematic structure of an aperture adjusting apparatus according to another exemplary embodiment.

FIG. 4 is a cross-sectional view showing a schematic structure of an aperture adjusting apparatus 101 according to another exemplary embodiment.

The aperture adjusting apparatus 101 of FIG. 4 differs from the aperture adjusting apparatus 100 described with respect to FIGS. 1 to 2B in that the aperture adjusting apparatus 101 has a structure capable of also functioning as a shutter by fully closing the aperture. An opaque pattern part 230 capable of blocking light which has transmitted through the lower channel C1 and the upper channel C2 is further formed on a central part of the third substrate 190. The opaque pattern part 230 may be formed with a size corresponding to a minimum size of the aperture, which is determined by a flow of the first fluid F1 and the second fluid F2. That is, when the electrode 121 nearest to the central part of the aperture adjusting apparatus 101 in the first electrode unit 120 is activated, the TCL of the lower channel C1 moves to the central part by as much as possible to form a minimum-sized aperture, and the opaque pattern part 230 may have a size corresponding to the minimum-sized aperture. In addition, since light which has transmitted through the minimum-sized aperture is blocked by the opaque pattern part 230, the shutter is fully closed.

Figure 5:
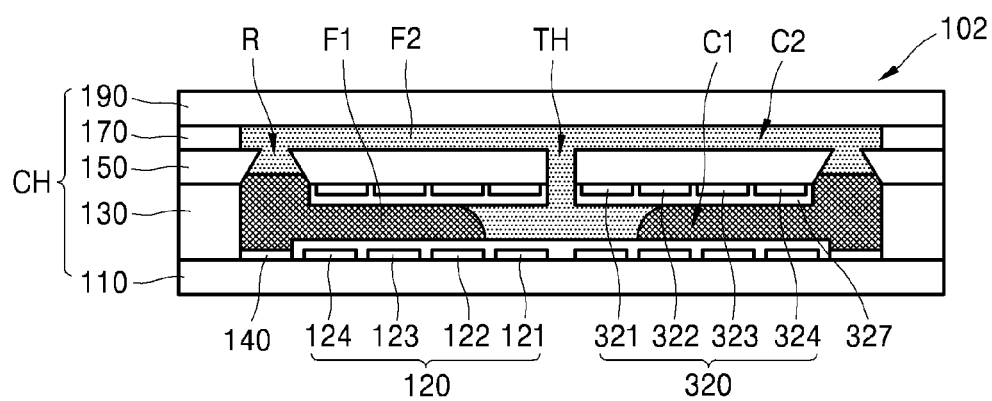
FIG. 5 is a cross-sectional view showing a schematic structure of an aperture adjusting apparatus according to another exemplary embodiment.

FIG. 5 is a cross-sectional view showing a schematic structure of an aperture adjusting apparatus 102 according to another exemplary embodiment.

The aperture adjusting apparatus 102 of FIG. 5 differs from the aperture adjusting apparatus 100 described with respect to FIGS. 1 to 2B in that the aperture adjusting apparatus 102 includes a second electrode unit 320 disposed on the lower surface of the second substrate 150. The second electrode unit 320 functions to increase a driving force generated in the lower channel C1 together with the first electrode unit 120. The second electrode unit 320 may include one or more electrodes coated with an insulation layer 327. The insulation layer 327 may be hydrophobic-surface-treated against the first fluid F1. The second electrode unit 320 may include one or more electrodes each having a concentric annulus shape. For example, the second electrode unit 320 may include a plurality of electrodes 321, 322, 323, and 324 having concentric annulus shapes with different radiuses. However, the second electrode unit 320 is not limited to the shown shape and number.

Figure 6:
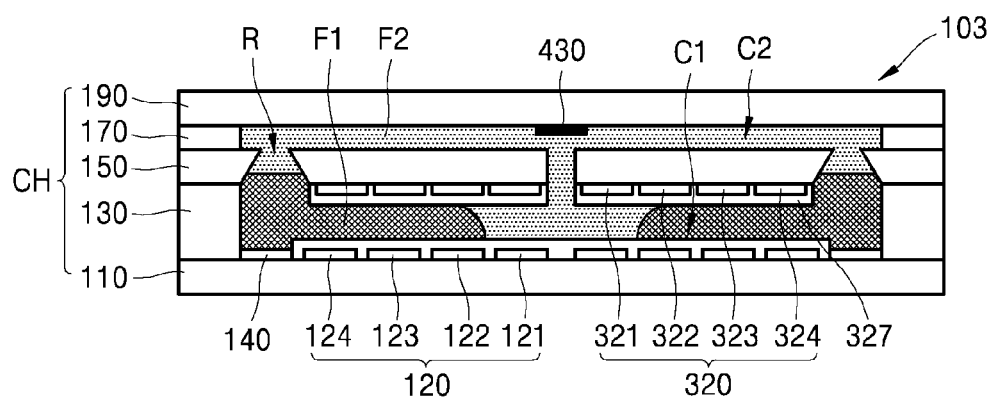
FIG. 6 is a cross-sectional view showing a schematic structure of an aperture adjusting apparatus according to another exemplary embodiment.

FIG. 6 is a cross-sectional view showing a schematic structure of an aperture adjusting apparatus 103 according to another exemplary embodiment.

The aperture adjusting apparatus 103 of FIG. 6 differs from the aperture adjusting apparatus 102 of FIG. 5 in that the aperture adjusting apparatus 103 has a structure capable of also functioning as a shutter by fully closing the aperture. That is, an opaque pattern part 430 capable of blocking light which has transmitted through the lower channel C1 and the upper channel C2 is further formed on a central part of the third substrate 190. The opaque pattern part 430 may be formed with a size corresponding to a minimum size of the aperture, which is determined by a flow of the first fluid F1 and the second fluid F2.

Figure 7:
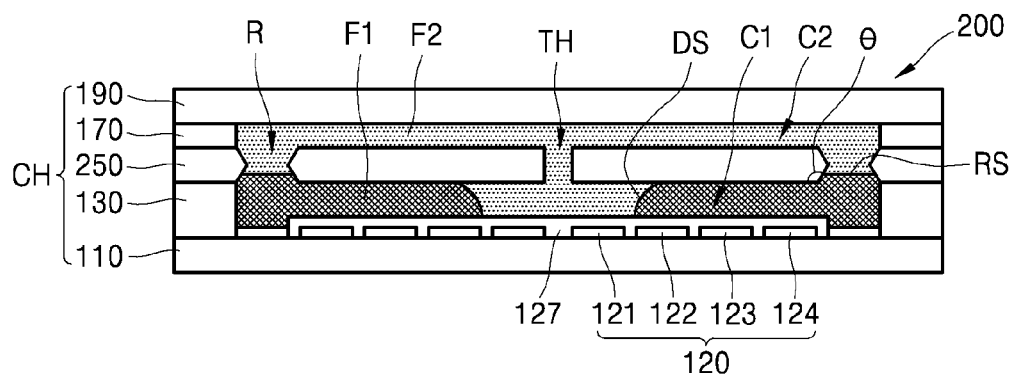
FIG. 7 is a cross-sectional view showing a schematic structure of an aperture adjusting apparatus according to another exemplary embodiment.

FIG. 7 is a cross-sectional view showing a schematic structure of an aperture adjusting apparatus 200 according to another exemplary embodiment.

The aperture adjusting apparatus 200 according to the current embodiment differs from the embodiments described in detail above with respect to a shape of the reservoir region R.

To form the reservoir region R, a through hole formed in the second substrate 250 has a hourglass shape of which a central part has a narrow width. A width across a flow direction of the first fluid F1 in the reservoir region R is narrowed and widened from the bottom to the top, and as shown in FIG. 7, the side surface of the reservoir region R may be sloped so that an angle is θ is symmetrically formed. The angle θ may be determined as a magnitude corresponding to a contact angle formed by the first fluid F1 on a membrane surface that is hydrophobic to the first fluid F1.

The current embodiment is the same as the embodiments described above in that a curvature of the interface RS of the first fluid F1 in the reservoir region R is almost 0 (zero), and that the current embodiment has a structure increasing a minimum flow speed of the first fluid F1 of the current embodiment according to a location of the interface DS of the first fluid F1 and a forward or backward motion of the first fluid F1 in the lower channel C1.

Figure 8:
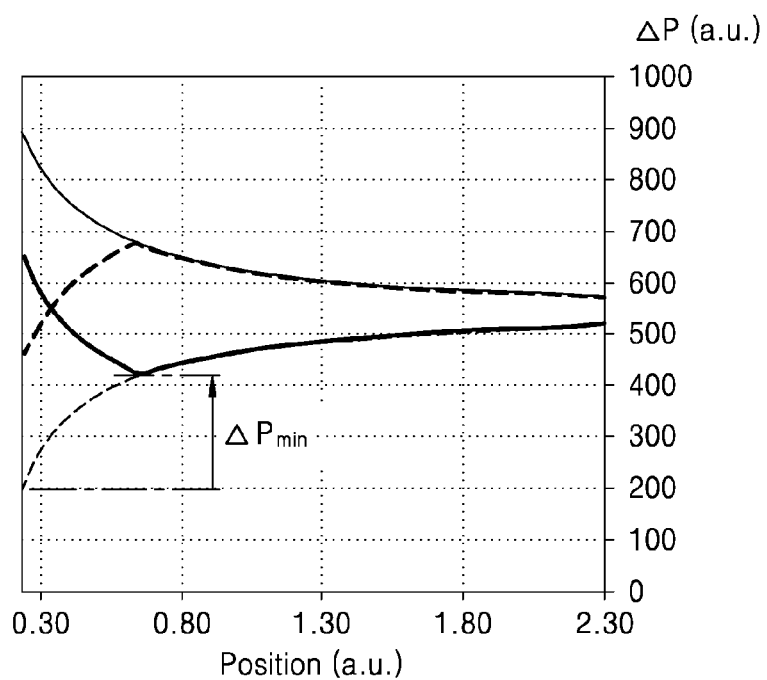
FIG. 8 is a graph comparing an aperture opening/closing speed of the aperture adjusting apparatus of FIG. 7 with a comparison example.

FIG. 8 is a graph comparing an aperture opening/closing speed of the aperture adjusting apparatus 200 of FIG. 7 with a comparison example.

Unlike the embodiment of FIG. 7, the comparison example is a case where a reservoir region has a uniform width.

In the graph, a horizontal axis indicates a location of the interface DS of the first fluid F1 in the lower channel C1, and a vertical axis indicates a difference ΔP between a pressure on the interface DS of the first fluid F1 in the lower channel C1 and a pressure on the interface RS of the first fluid F1 in the reservoir region R. A flow speed of the first fluid F1 is proportional to ΔP.

Referring to the graph, compared with the comparison example, a pressure difference minimum value $\Delta P_{min}$ is improved in the embodiment of FIG. 7.

Figure 9:
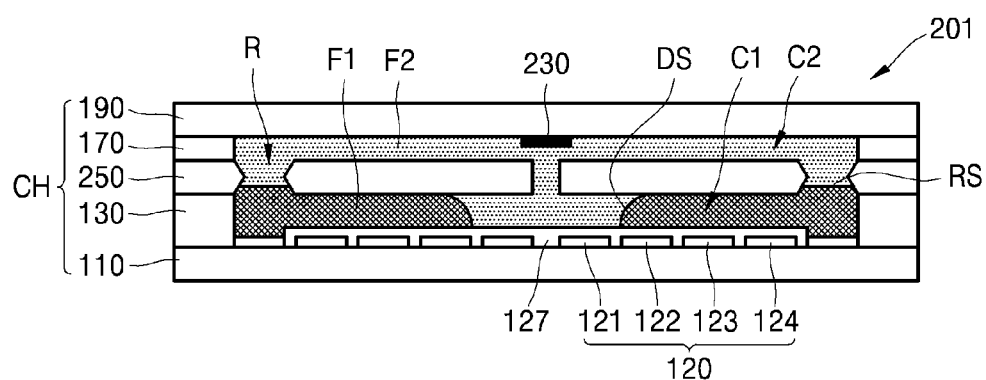
FIG. 9 is a cross-sectional view showing a schematic structure of an aperture adjusting apparatus according to another exemplary embodiment.

FIG. 9 is a cross-sectional view showing a schematic structure of an aperture adjusting apparatus 201 according to another exemplary embodiment.

The aperture adjusting apparatus 201 of FIG. 9 differs from the aperture adjusting apparatus 200 of FIG. 7 in that an opaque pattern part 230 capable of also functioning as a shutter by fully closing the aperture is further included.

That is, the opaque pattern part 230 capable of blocking light which has transmitted through the lower channel C1 and the upper channel C2 is further formed on a central part of the third substrate 190. The opaque pattern part 230 may be formed with a size corresponding to a minimum size of the aperture, which is determined by a flow of the first fluid F1 and the second fluid F2.

Figure 10:
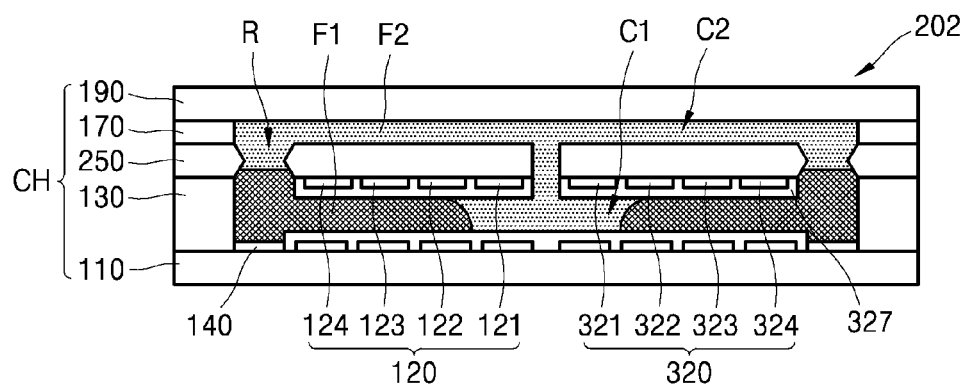
FIG. 10 is a cross-sectional view showing a schematic structure of an aperture adjusting apparatus according to another exemplary embodiment.

FIG. 10 is a cross-sectional view showing a schematic structure of an aperture adjusting apparatus 202 according to another exemplary embodiment.

The aperture adjusting apparatus 202 of FIG. 10 differs from the aperture adjusting apparatus 200 of FIG. 7 in that a second electrode unit 320, including one or more electrodes, is further included on the lower surface of the second substrate 150. The second electrode unit 320 functions to increase a driving force generated in the lower channel C1 together with the first electrode unit 120. The second electrode unit 320 may include one or more electrodes coated with an insulation layer 327. The insulation layer 327 may be hydrophobic-surface-treated against the first fluid F1. The second electrode unit 320 may include one or more electrodes each having a concentric annulus shape. For example, the second electrode unit 320 may include a plurality of electrodes 321, 322, 323, and 324 having concentric annulus shapes with different radiuses. However, the second electrode unit 320 is not limited to the shown shape and number.

Figure 11:
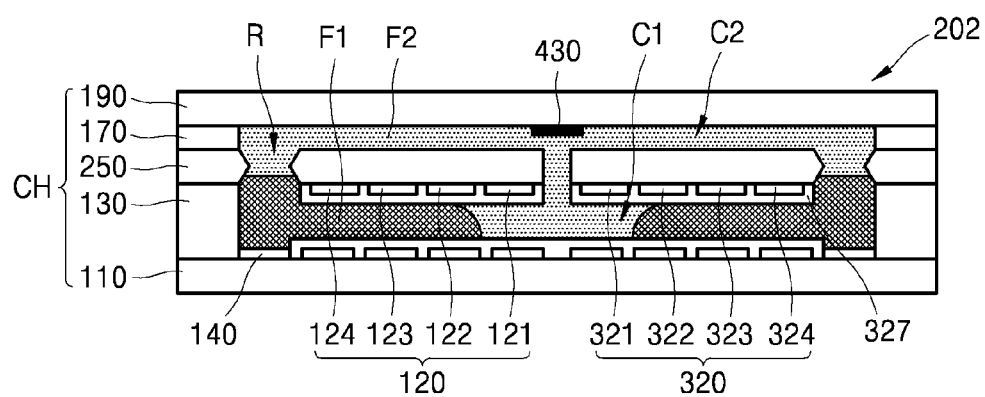
FIG. 11 is a cross-sectional view showing a schematic structure of an aperture adjusting apparatus according to another exemplary embodiment.

FIG. 11 is a cross-sectional view showing a schematic structure of an aperture adjusting apparatus 203 according to another exemplary embodiment.

The aperture adjusting apparatus 203 of FIG. 11 differs from the aperture adjusting apparatus 202 of FIG. 10 in that an opaque pattern part 430 capable of also functioning as a shutter by fully closing the aperture is further included.

That is, the opaque pattern part 430 capable of blocking light which has transmitted through the lower channel C1 and the upper channel C2 is further formed on a central part of the third substrate 190. The opaque pattern part 430 may be formed with a size corresponding to a minimum size of the aperture, which is determined by a flow of the first fluid F1 and the second fluid F2.

Figure 12:
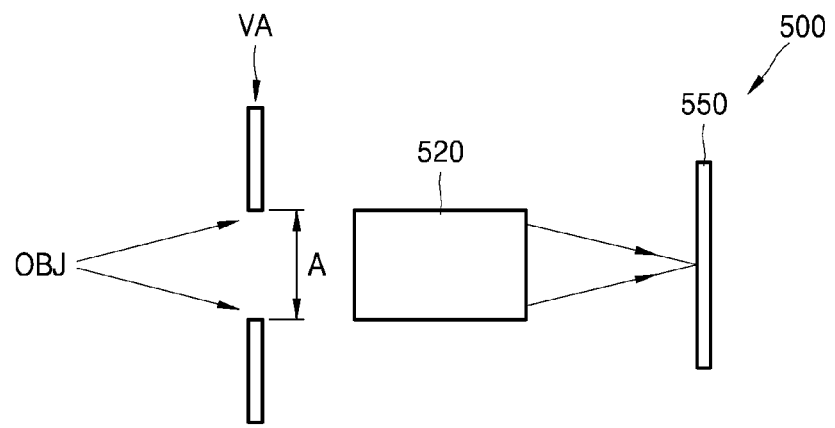
FIG. 12 is a schematic structural diagram of an image acquisition device according to an exemplary embodiment.

FIG. 12 is a schematic structural diagram of an image acquisition device 500 according to an exemplary embodiment.

The image acquisition device 500 includes a variable iris VA of which a size of an aperture A through which light from an object OBJ is incident is adjusted, an imaging part 520 for forming an image of the object OBJ from light incident through the variable iris VA, and an image pickup device 550 for converting the image formed by the imaging part 520 into an electrical signal.

For the variable iris VA, any one of the aperture adjusting apparatuses 100, 101, 102, 103, 200, 201, 202, and 203 described above may be employed, and the imaging part 520 may include one or more lenses. For the image pickup device 550, a charge-coupled device (CCD), a complementary metal-oxide semiconductor (CMOS) image pickup device, or the like may be employed.

Since the variable iris VA may perform fine driving at a high speed with a structure using a microelectrofluidic method, the image acquisition device 500 employing the variable iris VA is suitable to be used for medical image devices, such as an optical coherence tomography (OCT) device, a microscope, and the like.

Figure 13:
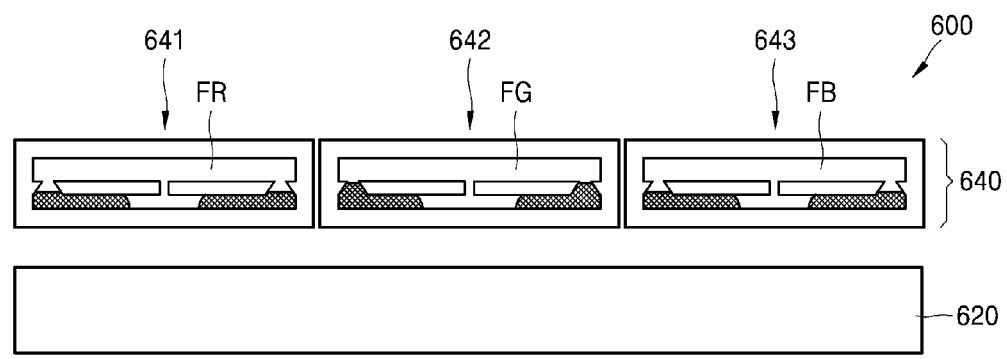
FIG. 13 is a cross-sectional view showing a schematic structure of an image display device according to an exemplary embodiment.

FIG. 13 is a cross-sectional view showing a schematic structure of an image display device 600 according to an exemplary embodiment.

The image display device 600 may include a light source unit 620 for providing light for forming an image and a display panel 640 for adjusting a transmissivity of the light provided by the light source unit 620 according to image information.

The display panel 640 may be formed by arraying any one of the aperture adjusting apparatuses 100, 101, 102, 103, 200, 201, 202, and 203 described above in multiple numbers. For example, the display panel 640 may include a first device 641, a second device 642, and a third device 643. The first device 641 is any one of the aperture adjusting apparatuses 100, 101, 102, 103, 200, 201, 202, and 203 described above and may include a photo-transmissive fluid FR representing a first color, the second device 642 is any one of the aperture adjusting apparatuses 100, 101, 102, 103, 200, 201, 202, and 203 described above and may include a photo-transmissive fluid FG representing a second color, and the third device 643 is any one of the aperture adjusting apparatuses 100, 101, 102, 103, 200, 201, 202, and 203 described above and may include a photo-transmissive fluid FB representing a third color. The first, second, and third colors may be red, green, and blue, respectively. Electrode unit driving of each of the first device 641, the second device 642, and the third device 643 may be controlled according to image information to transmit or block light incident from the light source unit 620, and in addition, since an aperture size may be adjusted in a transmit mode, a gradation display is possible.

Figure 14:
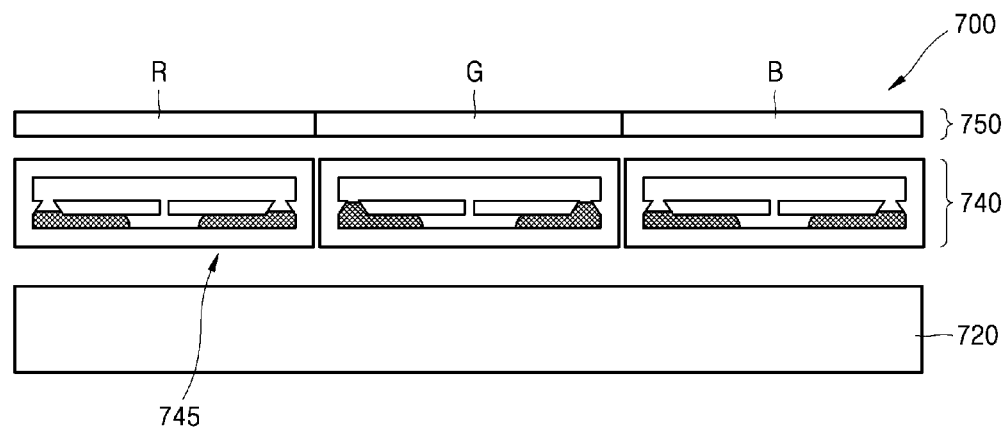
FIG. 14 is a cross-sectional view showing a schematic structure of an image display device according to another exemplary embodiment.

FIG. 14 is a cross-sectional view showing a schematic structure of an image display device 700 according to another exemplary embodiment.

The image display device 700 may include a light source unit 720 for providing light for forming an image and a display panel 740 for adjusting a transmissivity of the light provided by the light source unit 720 according to image information. The display panel 740 may be formed by arraying a plurality of aperture adjusting devices 745. As the aperture adjusting device 745, any one of the aperture adjusting apparatuses 100, 101, 102, 103, 200, 201, 202, and 203 described above or a modified one may be employed. The image display device 700 differs from the image display device 600 of FIG. 16 in that a color filter 750 for a color display is separately included. That is, the color filter 750 having color regions R, G, and B respectively corresponding to the plurality of aperture adjusting devices 745 is disposed on the display panel 740.

Electrode unit driving of each of the plurality of aperture adjusting devices 745 may be controlled according to image information to transmit or block light incident from the light source unit 720, and in addition, since an aperture size may be adjusted in a transmit mode to adjust the intensity of light incident on the color regions R, G, and B, a gradation display is possible.

As described above, according to the one or more of the above exemplary embodiments, since an aperture adjusting apparatus has an enclosed structure without an external driving pump or a mechanical device, it is easy to use the aperture adjusting apparatus and it is easy to manufacture the aperture adjusting apparatus.

In addition, the aperture adjusting apparatus has a circular aperture according to surface tension and is easy to miniaturize.

In addition, since a pressure difference between fluid interfaces in two connected channels and simultaneous electrowetting driving between two substrates are used, an iris opening/closing speed is fast and power consumption is low.

In addition, since a speed difference between forward and backward motions of a fluid, i.e., between opening and closing of an aperture, is little, it is easy to control the aperture.

In addition, since the aperture adjusting apparatus has a structure in which a fluid having a light-interceptive property is disposed in a lower channel and a reservoir and is not disposed in an upper channel, an aperture ratio is high.

It should be understood that the exemplary embodiments described therein should be considered in a descriptive sense only and not for purposes of limitation. Descriptions of features or aspects within each exemplary embodiment should typically be considered as available for other similar features or aspects in other embodiments.

What is claimed is:

1. An aperture adjusting apparatus comprising:
   a chamber comprising a lower channel, an upper channel, and a plurality of reservoir regions connecting the lower channel and the upper channel, each of the plurality of reservoir regions having a non-uniform width;
   a first fluid that is photo-interceptive and contained in the chamber;
   a second fluid that is photo-transmissive and contained in the chamber, the second fluid having a property that the second fluid does not mix with the first fluid; and
   a first electrode unit comprising at least one electrode configured to, in response an applied voltage, form an electric field in the chamber to adjust an aperture through which light transmits by a location change of an interface between the first fluid and the second fluid according to the electric field.

2. The aperture adjusting apparatus of claim 1, wherein one of the first fluid and the second fluid is a polar fluid, and the other one of the first fluid and the second fluid is a non-polar fluid.

3. The aperture adjusting apparatus of claim 2, wherein the chamber comprises:
   a first substrate on which the first electrode unit is disposed;
   a second substrate, which is disposed apart from the first substrate, and in which a plurality of through holes respectively defining the plurality of reservoir regions are provided;
   a third substrate separately disposed apart from the second substrate;
   a first spacer surrounding a space between the first substrate and the second substrate; and
   a second spacer surrounding a space between the second substrate and the third substrate.

4. The aperture adjusting apparatus of claim 3, wherein each of the plurality of reservoir regions has a shape so that a curvature of a surface of the first fluid in the reservoir region is less than a curvature of a surface of the first fluid in the lower channel.

5. The aperture adjusting apparatus of claim 3, wherein a side surface of each of the plurality of through holes is sloped by a certain angle with respect to a surface of the second substrate.

6. The aperture adjusting apparatus of claim 5, wherein an angle of the side surface of each of the plurality of through holes is determined as a magnitude corresponding to a contact angle formed by the first fluid on an interface hydrophobic to the first fluid.

7. The aperture adjusting apparatus of claim 3, wherein each of the plurality of through holes has a truncated cone shape.

8. The aperture adjusting apparatus of claim 3, wherein each of the plurality of through holes has an hourglass shape of which a central part has a narrow width.

9. The aperture adjusting apparatus of claim 3, wherein the plurality of through holes are provided along an outer circumferential area of the second substrate.

10. The aperture adjusting apparatus of claim 9, wherein another through hole is further provided at a central part of the second substrate.

11. The aperture adjusting apparatus of claim 3, wherein the first fluid is disposed in a circumferential area of the lower channel and the plurality of reservoir regions.

12. The aperture adjusting apparatus of claim 3, wherein a flow of the first fluid is limited within the plurality of reservoir regions and a region of the lower channel and does not move to the upper channel.

13. The aperture adjusting apparatus of claim 3, wherein the at least one electrode of the first electrode unit comprises at least one circular annulus electrode coated with an insulation layer.

14. The aperture adjusting apparatus of claim 13, wherein the insulation layer is hydrophobic-surface-treated against the first fluid.

15. The aperture adjusting apparatus of claim 3, further comprising a second electrode unit comprising at least one or electrode on a lower surface of the second substrate.

16. The aperture adjusting apparatus of claim 15, wherein the at least one electrode of the second electrode unit comprises at least one circular annulus electrode coated with an insulation layer.

17. The aperture adjusting apparatus of claim 16, wherein the insulation layer is hydrophobic-surface-treated against the first fluid.

18. The aperture adjusting apparatus of claim 3, further comprising a ground electrode provided in the chamber at a location contacting a polar fluid from among the first fluid and the second fluid.

19. The aperture adjusting apparatus of claim 18, wherein the ground electrode is disposed on the first substrate.

20. The aperture adjusting apparatus of claim 3, further comprising an opaque pattern part which is configured to block light transmitted through the lower channel and the upper channel, and disposed on a central part of the third substrate.

21. The aperture adjusting apparatus of claim 20, wherein the opaque pattern part has a size corresponding to a minimum size of the aperture, which is determined according to a flow of the first fluid and the second fluid.

22. An image acquisition device comprising:
the aperture adjusting apparatus of claim 1;
an imaging part configured to form an image of an object from light incident through the aperture adjusting apparatus; and
an image pickup device configured to convert the image formed by the imaging part into an electrical signal.

23. An image display device comprising:
a light source unit configured to provide light for forming an image; and
a display panel comprising a plurality of aperture adjusting apparatuses, each of the plurality of aperture adjusting apparatuses comprising the aperture adjusting apparatus of claim 1, and configured to adjust a transmissivity of the light provided by the light source unit according to image information.

24. The image display device of claim 23, wherein:
in a first one of the plurality of aperture adjusting apparatuses, the second fluid is configured to represent a first color;
in a second one of the plurality of aperture adjusting apparatuses, the second fluid is configured to represent a second color; and
in a third one of the plurality of aperture adjusting apparatuses, the second fluid is configured to represent a third color.

25. The image display device of claim 23, further comprising a color filter disposed on the display panel, the color filter having color regions respectively corresponding to the plurality of aperture adjusting apparatuses.

* * * * *